(12) United States Patent
Hemphill et al.

(10) Patent No.: US 8,820,811 B1
(45) Date of Patent: Sep. 2, 2014

(54) STANDARD INTERFACE RACK

(71) Applicant: Ford Global Technologies, LLC, Dearborn, MI (US)

(72) Inventors: Joshua Hemphill, Trenton, MI (US); Philip Van Wyk, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/914,982

(22) Filed: Jun. 11, 2013

(51) Int. Cl.
*B60R 9/06* (2006.01)
*B60R 9/00* (2006.01)

(52) U.S. Cl.
CPC .................................. *B60R 9/00* (2013.01)
USPC ........................................... 296/3; 248/222.52

(58) Field of Classification Search
CPC .................... B60R 9/00; B60R 9/06
USPC .............................. 296/3; 248/222.51, 222.52
See application file for complete search history.

(56) References Cited

U.S. PATENT DOCUMENTS

| | | | |
|---|---|---|---|
| 2,570,802 A | 10/1951 | Hatteburg | |
| 2,680,544 A | 6/1954 | Hunt, Sr. et al. | |
| 4,057,182 A | 11/1977 | Kolkhorst et al. | |
| 4,138,046 A | 2/1979 | De Freze | |
| 4,423,899 A | 1/1984 | Langmead | |
| 4,751,981 A | 6/1988 | Mitchell et al. | |
| 5,255,951 A * | 10/1993 | Moore, III | 296/3 |
| 5,662,254 A | 9/1997 | Lemajeur et al. | |
| 5,725,137 A | 3/1998 | Macdonald | |
| D494,532 S | 8/2004 | Reese | |
| 6,769,853 B2 * | 8/2004 | Perrot | 411/553 |
| 8,157,312 B2 * | 4/2012 | Bliss et al. | 296/37.6 |
| 8,403,191 B2 | 3/2013 | Russo | |
| 2003/0201656 A1 | 10/2003 | Ferguson et al. | |
| 2008/0079277 A1 | 4/2008 | Wethington | |
| 2009/0096236 A1 | 4/2009 | Hawley | |
| 2009/0255966 A1 | 10/2009 | Prapavat | |
| 2011/0266322 A1 | 11/2011 | Jones | |
| 2013/0075436 A1 | 3/2013 | Martin | |

* cited by examiner

*Primary Examiner* — Dennis H Pedder
*Assistant Examiner* — Beverly Becker
(74) *Attorney, Agent, or Firm* — Raymond Coppiellie; Price Heneveld LLP

(57) ABSTRACT

A vehicle interface rack includes at least one twist-lock bracket configured to be inserted into a vehicular twist-lock receptacle and rotated a predetermined distance within the vehicular twist-lock receptacle to define a locked position. The vehicle interface rack also includes a rack structure configured to rest upon a vehicle bed when the rack structure is in a secured position defined by a securing portion of the rack structure being coupled with the at least one twist-lock bracket disposed in the locked position.

20 Claims, 13 Drawing Sheets

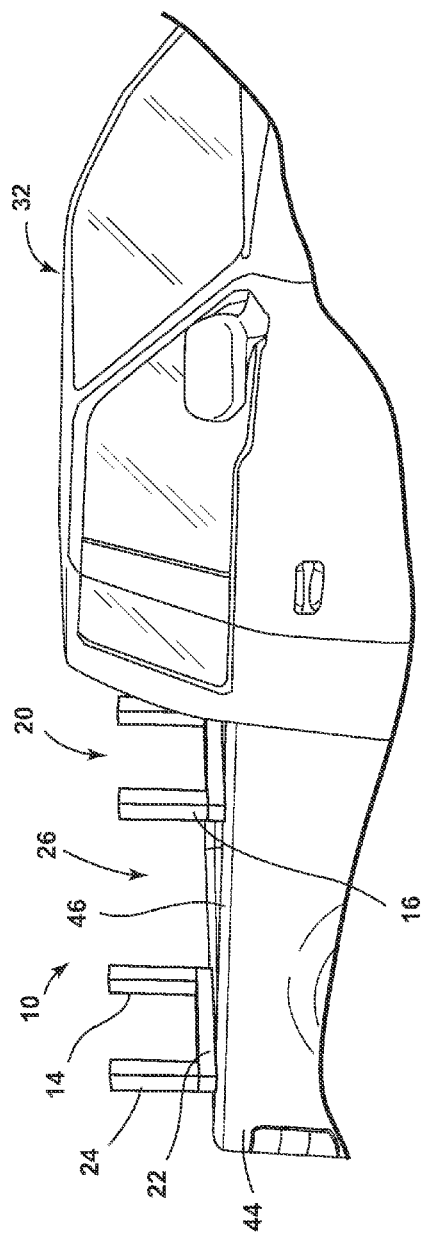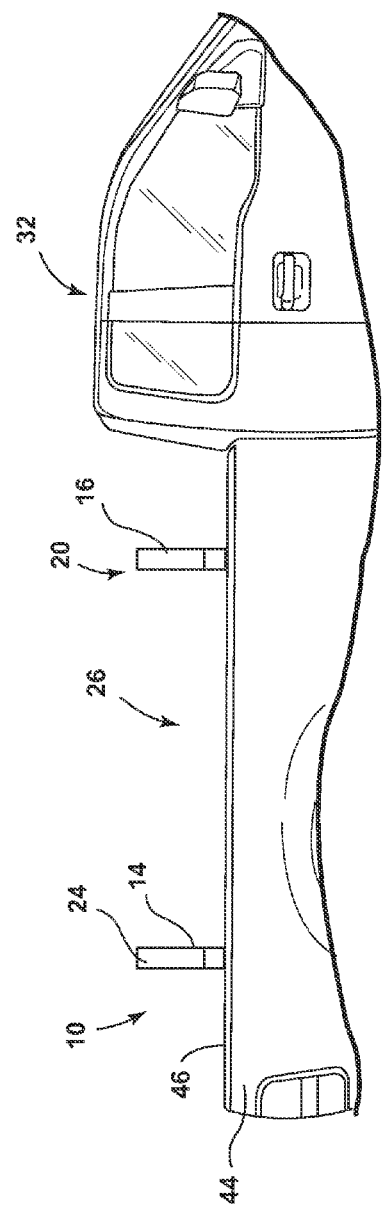
FIG. 6
FIG. 7

STANDARD INTERFACE RACK

FIELD OF THE INVENTION

The present invention generally relates to a utility rack for a vehicle, more specifically, a removable utility rack for a pick-up truck.

BACKGROUND

There are various racks and that can be installed on a vehicle to assist a user in the transportation of accessory items such as building materials, athletic equipment, and the like. These products are typically installed on the roof or on a bedrail of a vehicle to keep the accessory items in a high location so as to not interfere with the sightlines of the vehicle. These racks can interfere with the operation of the vehicle because of a high center of gravity caused by the placement of these racks and cause unwanted lateral forces to be applied on the vehicle while driving.

SUMMARY OF THE INVENTION

According to one aspect of the present invention, a vehicle interface rack includes at least one twist-lock bracket configured to be inserted into a vehicular twist-lock receptacle and rotated a predetermined distance within the vehicular twist-lock receptacle to define a locked position. The vehicle interface rack also includes a rack structure configured to rest upon a vehicle bed when the rack structure is in a secured position defined by a securing portion of the rack structure being coupled with the at least one twist-lock bracket disposed in the locked position.

According to another aspect of the present invention, a vehicle interface rack includes a twist-lock assembly having a locked position defined by at least one bracket rotationally secured to a sidewall receptacle of a pick-up truck bedrail. Also included is a rack structure having a secured position defined by a securing portion of the rack structure engaging the twist-lock assembly in the locked position and the rack structure vertically supported by a pick-up truck bed and a top surface of the bedrail.

According to yet another aspect of the present invention, an interface rack includes a rack structure and first and second interface plates that laterally support the rack structure when the rack structure is in a secured position. The first and second interface plates are disposed on a lateral surface of a side rail of a pick-up truck bed. The interface rack also includes first and second twist-lock brackets, each having a locked position defined by the first and second twist-lock brackets rotatably coupled with the first and second interface plates, respectively. The first and second twist-lock brackets selectively couple the rack structure to the first and second interface plates when the first and second twist-lock brackets are in the locked position and the rack structure is in the secured position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a side perspective view of the standard interface rack of FIG. 1 installed in the vehicle;

FIG. 7 is a side elevational view of the standard interface rack of FIG. 1 installed in the vehicle;

DETAILED DESCRIPTION OF THE PREFERRED EMBODIMENTS

Figure 1:
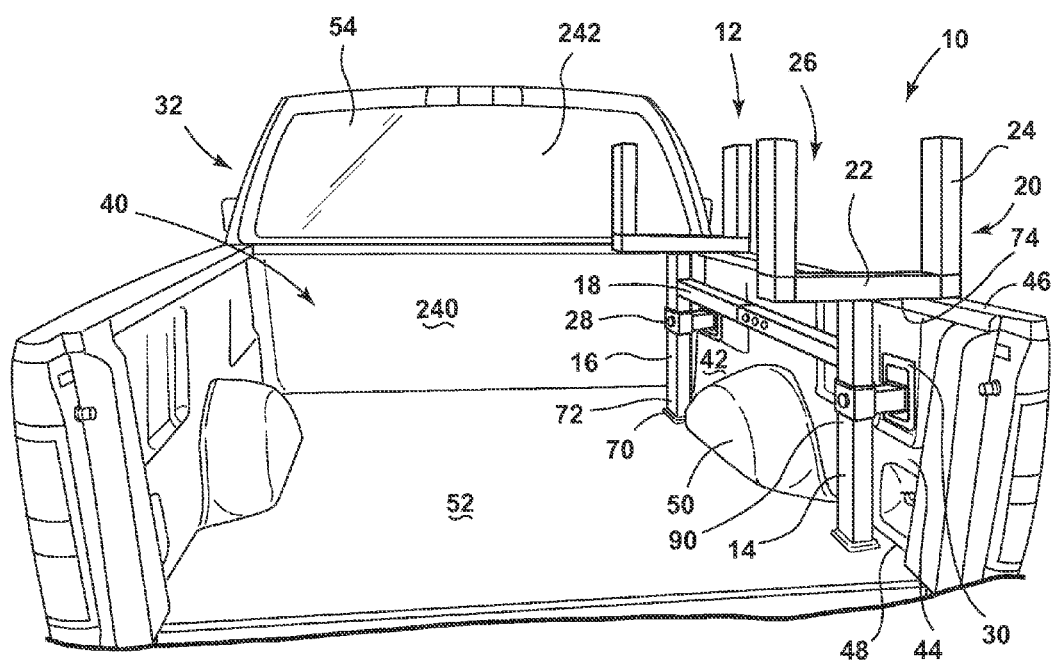
FIG. 1 is a rear perspective view of a vehicle with an embodiment of the standard interface rack installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, reference numeral 10 generally refers to a standard interface rack 10 shown installed on the bed of a pick-up truck, according to one embodiment. The standard interface rack 10 includes a rack structure 12 having first and second vertical support members 14, 16 that are connected by an adjustable cross beam 18. Each of the first and second vertical support members 14, 16 includes a utility rack 20 that can include a rack cross bar 22 and one or more rack lateral supports 24. The rack lateral supports 24 can extend vertically from the rack cross bar 22 such that the utility racks 20 of the first and second vertical support members 14, 16 form a utility support region 26 defined by the rack cross bars 22 and the rack lateral supports 24 of the first and second vertical support members 14, 16. The rack structure 12 can be coupled to a pick-up truck 32 by a twist-lock mechanism that can include one or more twist-lock brackets 28 that are configured to engage one or more standard interface plates 30 disposed on the pick-up truck 32.

Figure 8:
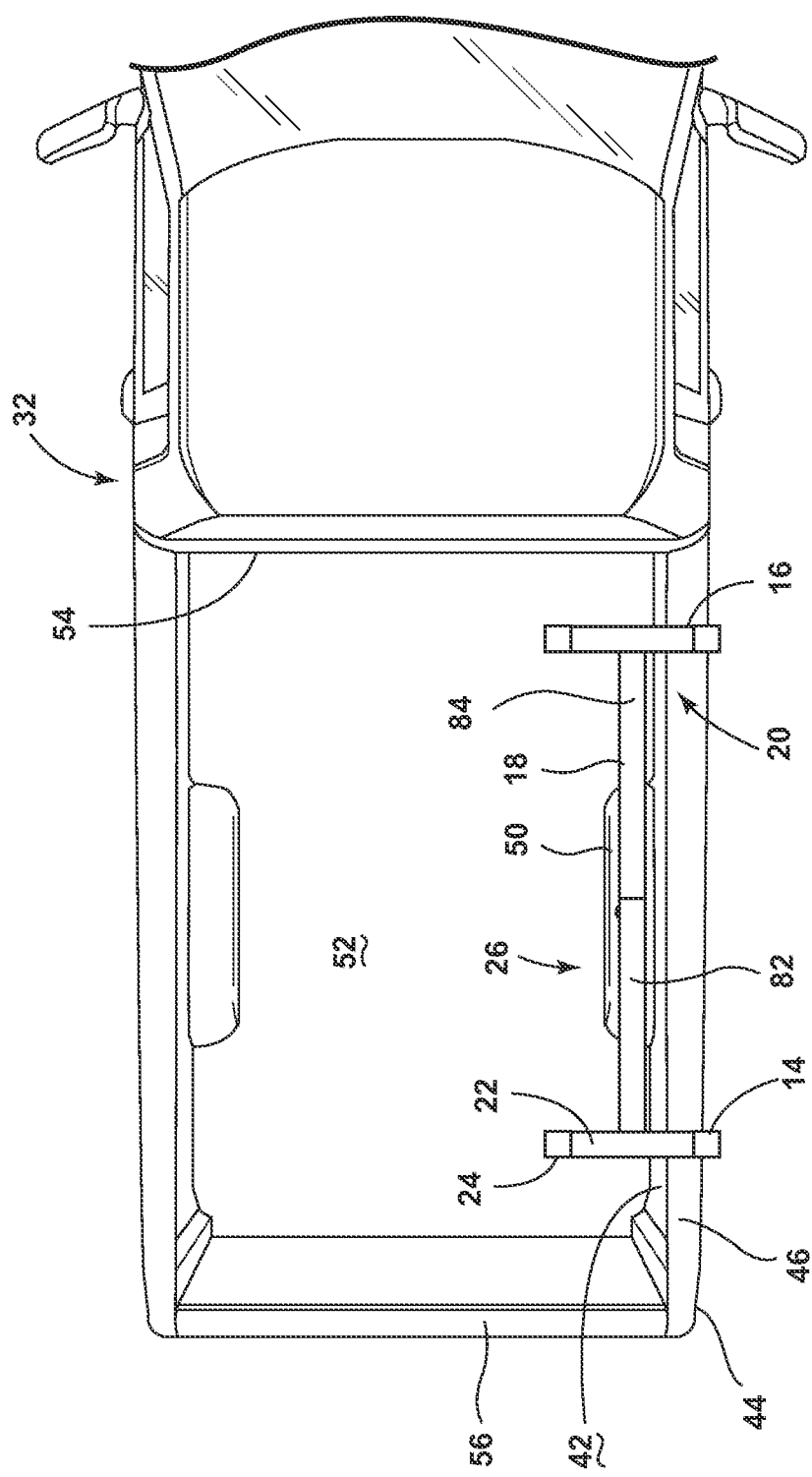
FIG. 8 is a top perspective view of the standard interface rack of FIG. 1 installed in the vehicle.

As shown in FIG. 1, the standard interface rack 10 is installed on a vehicle, and more particularly, within the bed 40 of a pick-up truck 32 where the twist-lock brackets 28 can engage standard interface plates 30 that are disposed on an inner surface 42 of a sidewall 44 of the bed 40. The standard interface plates 30 are located between the top surface 46 and the bottom edge 48 of the sidewall 44. In addition, the standard interface plates 30 are spaced apart laterally to extend over the tire well 50 of the pick-up truck 32. In this manner, the first and second vertical support members 14, 16 rest on a floor 52 of the pick-up truck bed 40 where one of the vertical support members is on a front or cab 54 side of the tire well 50 and the other vertical support member is located on a rear or tailgate 56 (shown in FIG. 8) side of the tire well 50.

Figure 2:
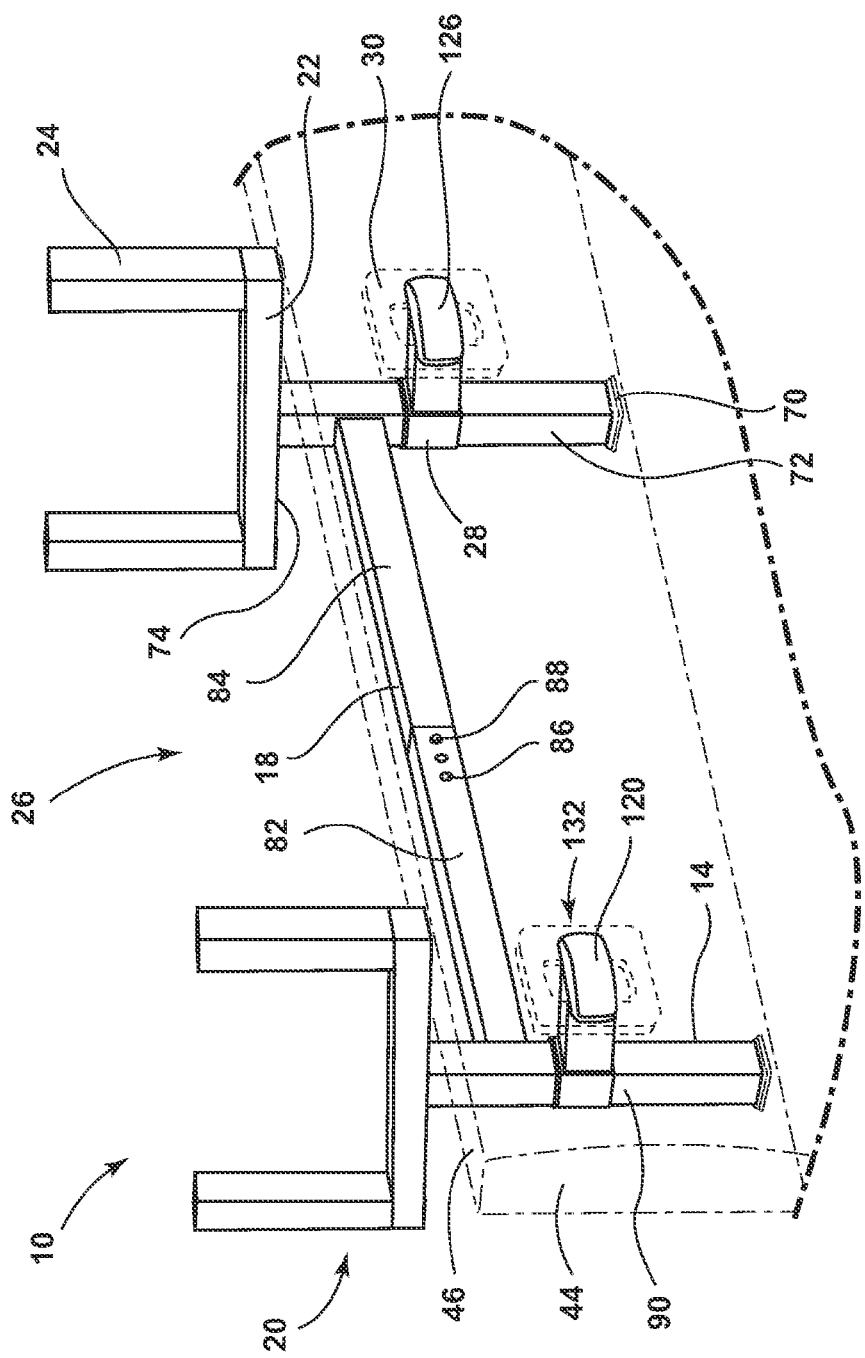
FIG. 2 is a side perspective view of an embodiment of the standard interface rack.

As illustrated in FIGS. 1 and 2, when installed in a secured position in the pick-up truck bed 40, the standard interface rack 10 rests upon the floor 52 of the pick-up truck bed 40 at base members 70 that are disposed on lower ends 72 of the first and second vertical support members 14, 16. The base members 70 can either be integral to the vertical support members 14, 16 or can be a separate piece. In embodiments where each base member 70 is a separate piece, the base members 70 can be made of materials that can include, but are not limited to, plastic or rubberized materials that can provide an at least partial friction connection that helps to limit the lateral movement of the standard interface rack 10. At the same time, the standard interface rack 10 can also rest upon the top surface 46 of the sidewall 44 when the standard interface rack 10 is in the secured position, such that the bottom surface 74 of the rack cross bars 22 rest upon the top surface 46 of the sidewall 44. The standard interface rack 10 is laterally supported by the inner surface 42 of the sidewall 44 via the standard interface plate 30 and the twist-lock bracket 28, when the twist-lock bracket 28 is installed in the standard interface plate 30 in a locked position 132. The connection of the twist-lock bracket 28 into the standard interface plate 30 will be discussed in greater detail below.

Referring again to FIG. 1 of the illustrated embodiment, the standard interface rack 10 is vertically supported primarily by the floor 52 of the pick-up truck bed 40. In this manner, the center of gravity of the standard interface rack 10, when installed in the pick-up truck 32, can be located within the container of the truck bed 40 defined by the cab 54, the bed 40, the sidewalls 44 and the tailgate 56 (shown in FIG. 8) of the pick-up truck 32. In this manner, the lateral and moment forces created by loads placed within the standard interface rack 10 can be minimized because of the center of gravity being disposed lower on the first and second vertical support members 14, 16. Minimizing the lateral and moment forces exerted by loads placed within the standard interface rack 10 also minimizes stress upon the structure of the pick-up truck 32.

As illustrated in FIGS. 1 and 2, the standard interface rack 10 is typically installed in the bed 40 of a pick-up truck 32. In various alternate embodiments, the standard interface rack 10, because of the adjustable cross beam 18, can be installed in a variety of different vehicles. The adjustable cross beam 18 can include first and second portions 82, 84 that are coupled to the first and second vertical support members 14, 16, respectively. The first and second portions 82, 84 of the adjustable cross beam 18 are configured such that the first and second portions 82, 84 can cooperatively slide along one another to adjust the distance between the first and second vertical support members 14, 16. The first and second portions 82, 84 can also include cooperating holes 86 through which a securing member 88 can be inserted to secure the adjustable cross beam 18 at a predetermined length. The securing member 88 can include, but is not limited to, a screw, bolt or pin. In alternative embodiments, the first and second portions 82, 84 of the adjustable cross beam 18 can be secured by other securing mechanisms that can include, but are not limited to, hasps, clasps, hooks or other securing mechanisms. The adjustability of the adjustable cross beam 18 provides for varying lateral distances between the two vertical support members 14, 16 that may be necessary to account for the dimensional parameters of a particular vehicle. This adjustability can also account for different configurations of the standard interface plates 30 within different vehicles as well as differences in the size of various vehicles. The twist-lock brackets 28 can also be secured in a variety of vertical locations on a securing portion 90 of the first and second vertical support members 14, 16 to account for varying heights of the standard interface plates 30 above the floor 52 of the bed 40.

As illustrated in FIGS. 1, 2 and 6-9, typically, the standard interface rack 10 engages a pick-up truck 32 such that the only mechanical or interference connection between the standard interface rack 10 and the pick-up truck 32 is through the twist-lock bracket 28 that engages both the securing portions 90 of the first and second vertical support members 14, 16 as well as the standard interface plates 30 that are installed in the sidewall 44 of the pick-up truck 32. The remaining engagement points between the standard interface rack 10 and the pick-up truck 32 are surface connections where the standard interface rack 10 rests upon the floor 52 of the bed 40 and the top surface 46 of the sidewall 44 of the pick-up truck 32. In various alternate embodiments, the standard interface rack 10 can be additionally secured by a shoulder, a raised or lowered portion, or other receptacle defined in the surface of the pick-up truck 32 that at least partially surrounds and laterally supports the standard interface rack 10.

In alternate embodiments, the standard interface rack 10 can be installed on vehicles other than pick-up trucks 32 that can include, but are not limited to, sport utility vehicles, sedans, vans, and other vehicles. In addition, while the standard interface rack 10 is shown to be installed on an inward-facing surface of the pick-up truck 32, various embodiments of the standard interface rack 10 can include an installation mechanism on an outward-facing wall of the pick-up truck 32. Alternate connection points of this type are configured such that the primary vertical support for the standard interface rack 10 is on an outward surface of the vehicle, such as a bumper, a cab 54, a fender, or some other substantially horizontal surface that can vertically support the standard interface rack 10. In such an embodiment, the primary lateral support for the standard interface rack 10 is via the twist-lock bracket 28 being engaged with the first and second vertical support members 14, 16 and corresponding standard interface plates 30 installed in an outward portion of the pick-up truck 32.

Referring now to FIGS. 1-5, the standard interface rack 10 includes at least one twist-lock bracket 28 that is configured to engage an interface receptacle disposed on the surface 42 of the pick-up truck 32. The interface receptacle can include the standard interface plate 30 and a twist-lock recess 102 defined within the standard interface plate 30. The twist-lock recess 102 can also include a back wall 104 that can be at least partially defined by the standard interface plate 30. In various embodiments, the back wall 104 of the twist-lock recess 102 can be defined by a portion of the inner surface 42 of the sidewall 44 proximate the standard interface plate 30. The twist-lock recess 102 also includes an opening 106 defined by a recess edge 108. The opening 106 has a long axis 110 and a short axis 112 such that the opening 106 is generally oblong or oval in shape. In various embodiments, the opening 106 can be symmetrical where the long and short axes are perpendicular. In various alternate embodiments, the opening 106 can be asymmetrical.

As shown in FIGS. 2-5 of the illustrated embodiment, the twist-lock bracket 28 includes a twist-lock fitting 120 that is oval or substantially oblong in shape to cooperate with the opening 106 of the twist-lock recess 102, such that a first axis 122 is longer than a second axis 124. As with the opening 106, the twist-lock fitting 120 can be configured to be symmetrical or asymmetrical. In addition, in the twist-lock fitting 120 need not be the same shape as the opening 106, so long as the twist-lock fitting 120 can be inserted in the opening 106 and secured within the twist-lock recess 102 when rotated a predetermined distance. The twist-lock fitting 120 is slightly smaller than the opening 106 such that the twist-lock fitting 120 can pass through the opening 106 of the twist-lock recess 102 when the first axis 122 of the twist-lock fitting 120 is parallel with the long axis 110 of the opening 106. The twist-lock fitting 120 can also include a curved surface 126 that is configured to guide the twist-lock fitting 120 into the opening 106 of the twist-lock recess 102 as the twist-lock fitting 120 is moved toward and into the opening 106. In this manner, the twist-lock fitting 120 does not necessarily have to be inserted in exact alignment with the opening 106. As the curved surface 126 engages the recess edge 108, the curved surface 126 can slide along the recess edge 108 of the standard interface plate 30 so that the curved surface 126 biases the twist-lock fitting 120 toward an aligned position within the opening 106. In this manner, the twist-lock fitting 120 can be guided through the opening 106 and into the twist-lock recess 102.

Referring again to FIGS. 3 and 5 of the illustrated embodiment, and as discussed above, the opening 106 is configured such that it is slightly larger than the twist-lock fitting 120 to allow the twist-lock fitting 120 to pass through the opening 106. In addition, the twist-lock recess 102 has a sufficient depth such that as the twist-lock fitting 120 is inserted through the opening 106, the second surface 128 of the twist-lock fitting 120 can pass through the opening 106 and pass behind an engagement surface 130 of the standard interface plate 30 and into the twist-lock recess 102. The twist-lock recess 102 must also have a sufficient depth to allow the curved surface 126 of the twist-lock fitting 120 to engage the back wall 104 of the twist-lock recess 102 such that the twist lock fitting 120 can be rotated within the twist-lock recess 102 a predetermined distance. As the twist-lock fitting is rotated, the second surface 128 of the twist-lock fitting 120 is configured to engage and gradually tighten against the engagement surface 130 of the standard interface plate 30.

Figure 3:
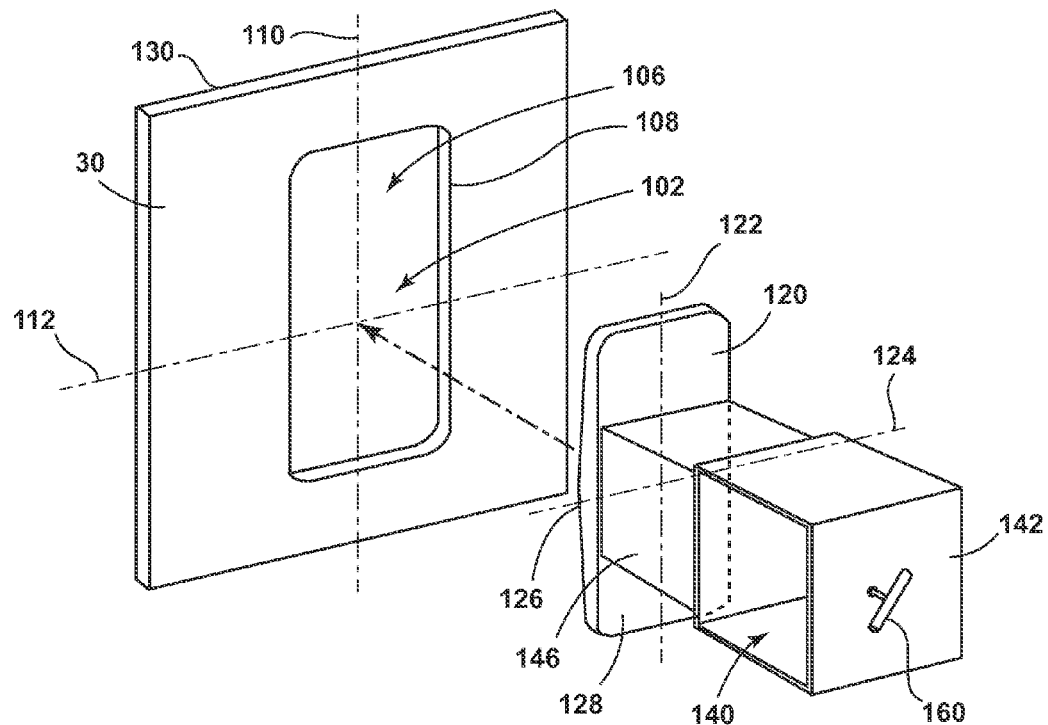
FIG. 3 is a detailed perspective view of an embodiment of the connector of the standard interface rack in an unsecured position.
Figure 4:
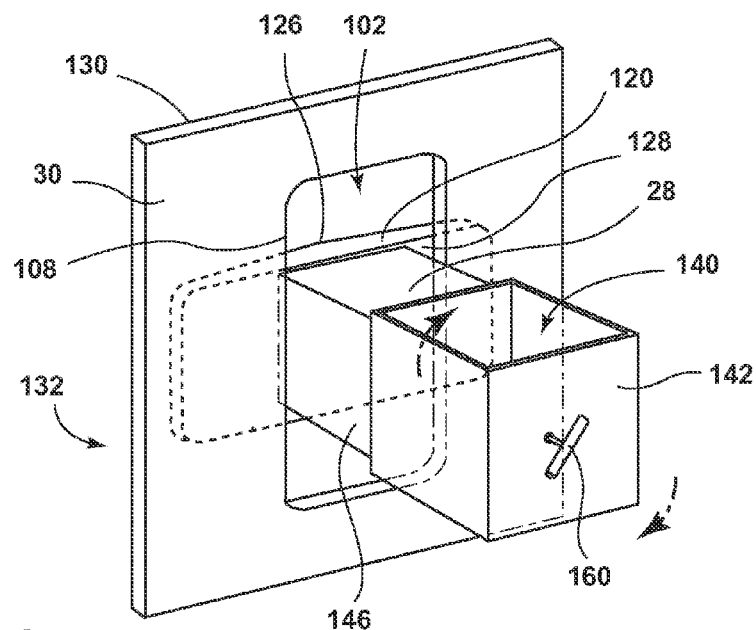
FIG. 4 is a detailed perspective view of the connector of the standard interface rack of FIG. 3 in a secured position.
Figure 5:
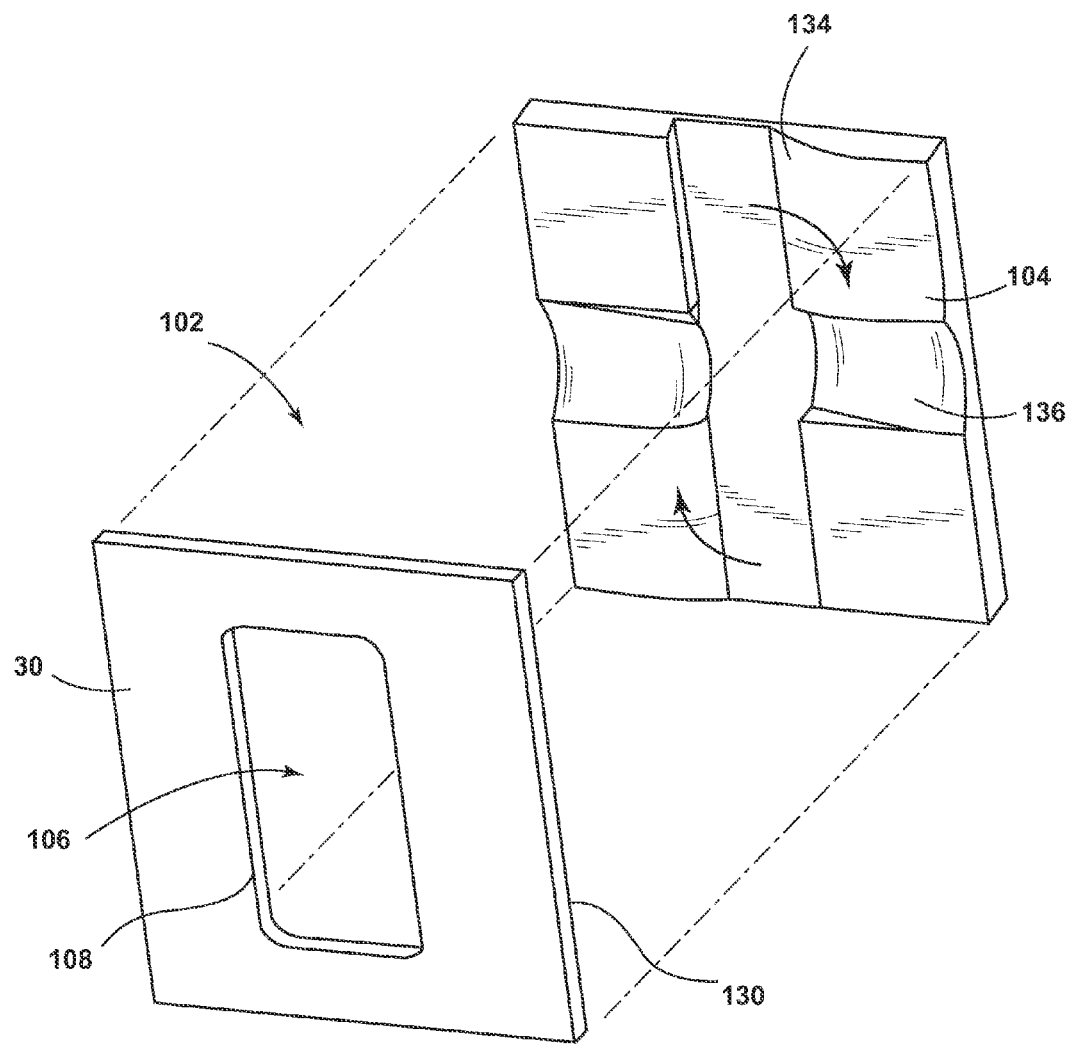
FIG. 5 is a detailed perspective view of one embodiment of the standard interface plate.

As illustrated in FIGS. 3-5, in one embodiment, the back wall 104 of the twist-lock recess 102 includes a sloped portion 134 that is configured to cooperate with the curved surface 126 of the twist-lock fitting 120. As the twist-lock fitting 120 is rotated within the twist-lock recess 102, the curved surface 126 of the twist-lock recess 102 biases the second surface 128 of the twist-lock fitting 120 toward and against the engagement surface 130 of the standard interface plate 30 to tighten the twist-lock fitting 120 against the standard interface plate 30 into a locked position 132. In this manner, as the twist-lock fitting 120 is rotated within the twist-lock recess 102, the twist-lock bracket 28 is secured within the twist-lock recess 102 to define the locked position 132. The distance that the twist-lock bracket 28 needs to be rotated in order to be secured within the twist-lock recess 102 can vary. Such radial distances can include, but are not limited to, 60°, 90°, and 120°. In addition, the twist-lock bracket 28 can be configured such that the bracket can be tightened in the twist-lock recess 102 by rotating the twist-lock bracket 28 in a clockwise direction, a counter-clockwise direction or either direction. The twist-lock recess can also be configured to prevent the twist-lock fitting 120 from rotating a full 360° through an interference portion 136 of the back wall 104 that is configured to receive the curved surface 126 of the twist-lock fitting 120 after the twist-lock bracket 28 has been rotated the predetermined distance. The interference portion 136 is configured to receive and retain the twist-lock fitting 120 in the locked position 132 until such time as the twist-lock bracket 28 is rotated out of the locked position 132 by the user. The radial distance required to secure the twist-lock bracket 28 within the interface portion 136 should be configured such that when the twist-lock bracket 28 is secured within the twist-lock recess 102 in the locked position 132, the post receptacle 140 of the twist-lock bracket 28 is oriented in a substantially vertical configuration such that the securing portions 90 of the first and second vertical support members 14, 16 can pass through the respective post receptacles 140 such that the base members 70 can rest upon the floor 52 of the pick-up truck bed 40 (shown in FIG. 1).

In alternate embodiments, the second surface 128 of the twist-lock fitting 120 includes the sloped portion 134 such that as the twist-lock bracket 28 is rotated within the twist-lock recess 102, the sloped portion 134 engages the engagement surface 130 of the standard interface plate 30. In this manner, the curved surface 126 of the twist-lock fitting 120 is biased against the back wall 104 of the twist-lock recess 102 and the twist-lock fitting 120 is tightened within the twist-lock recess 102. In other alternate embodiments, the engagement surface 130 of the standard interface plate 30 can include the sloped portion 134.

In various embodiments, the standard interface plate 30 can be a separate plate that is attached to the surface of the pick-up truck 32 by methods that include, but are not limited to, welding, bolting, or other types of fastening methods. In other alternate embodiments, the standard interface plate 30 can include a portion of the surface of the pick-up truck 32, wherein the opening 106 is defined by the inner surface 42 of the sidewall 44 and the twist-lock recess 102 is defined by a cavity within the sidewall 44 into which the twist-lock fitting 120 can be inserted and twisted to be secured. In such an embodiment, additional material can be attached to the sidewall 44 proximate the twist-lock recess 102 to reinforce the twist-lock recess 102 to receive the twist-lock bracket 28 and carry the lateral loads exerted upon the interface receptacle when the standard interface rack 10 is connected to the sidewall 44.

As illustrated in FIGS. 2 and 4, the twist-lock bracket 28 also includes a post receptacle 140 defined by a plurality of sidewalls 142 where the plurality of sidewalls 142 define a through passage into which the securing portions 90 of the first or second vertical support member 14, 16 can be inserted and secured. The orientation of the post receptacle 140 is substantially parallel to the short axis 112 of the twist-lock fitting 120. In alternate embodiments, the twist-lock fitting 120 can be configured such that the post receptacle 140 is substantially parallel with the long axis 110 of the twist-lock fitting 120. A spacing bar 146 extends between a second surface 128 of the twist-lock fitting 120 and one of the sidewalls 142 that defines the post receptacle 140. The spacing bar 146 is configured to separate the post receptacle 140 and the twist-lock fitting 120 by a sufficient distance such that the base members 70 of the first and second vertical support members 14, 16 can rest upon the floor 52 of the pick-up truck bed 40 and at the same time, the lower surface of the horizontal cross bars can rest upon the top surface 46 of the sidewall 44 when the standard interface rack 10 is in the secured position. In this manner, the length of the spacing bar 146 may be different depending upon the vehicle onto which the standard interface rack 10 is installed. In other various embodiments, the spacing bar 146 can be adjustable to account for variations between models of vehicles such that the standard interface rack 10 can be adjusted such that a single standard interface rack 10 can be installed in a variety of different vehicles, or in different areas of the same vehicle.

As shown in FIGS. 1-4 of the illustrated embodiment, when the first and second twist-lock brackets 28 are secured in the locked position 132 within the first and second twist-lock recesses 102, the post receptacles 140 are oriented in a substantially vertical configuration. In this orientation, the post receptacles 140 are in a position to receive the securing portions 90 of the first and second vertical support members 14, 16 to dispose the rack structure 12 in the secured position. The securing portions 90 of the first and second vertical support members 14, 16 can then be inserted into the post receptacles 140. In various embodiments, the base members 70 are wider than the post receptacles 140 and can be removed from the first and second vertical support members 14, 16 before the securing portions 90 are inserted into the post receptacles 140. After the securing portions 90 are inserted, the base members 70 can then be replaced such that the base members 70 can rest on the floor 52 of the pick-up truck 32 bed 40 and support the rack structure 12.

Referring again to FIGS. 2 and 4, when the vertical support members 14, 16 are inserted into the post receptacles 140 of the twist-lock brackets 28, a securing mechanism 160 can be used to secure the securing portion 90 of the vertical support members 14, 16 within the post receptacles 140. Various types of securing mechanisms 160 can be included in the twist-lock bracket 28 that can include, but are not limited to, screws, bolts, pins, latches, and other types of fasteners that can be used to locate the twist-lock bracket 28 in a variety of vertical positions on one of the vertical support members 14, 16.

Referring again to FIGS. 1-4, the standard interface rack 10 can be made of various materials that can include, but are not limited to, metals, plastics, composite materials, combinations of these materials, or other substantially rigid materials that can support loads typically carried by pick-up trucks and other utility vehicles. The standard interface rack 10 can be constructed by welding together the various members or using alternate connection methods that can include, but are not limited to, welding, adhesives, or other substantially rigid connection methods.

Figure 15:
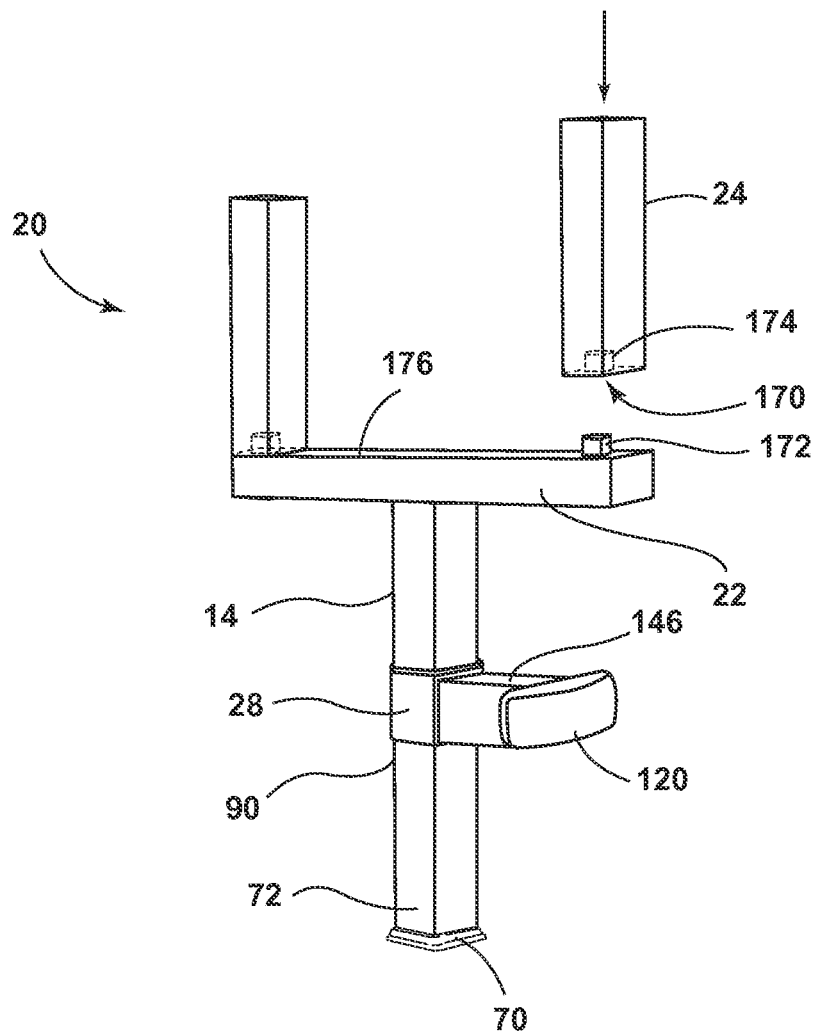
FIG. 15 is a detail perspective view of an alternate embodiment of the standard interface rack.

Referring now to FIG. 15 of the illustrated embodiment, various portions of the standard interface rack 10 can be selectively removable. By way of illustration, and not limitation, the rack lateral supports 24 can be selectively removable from the rack cross bar 22 of the vertical support members 14, 16. An engaging recess 170 can be defined by a bottom end 174 of the rack lateral support that cooperatively engages a protrusion 172 disposed in the upper surface 176 of the rack cross bar 22, such that the rack lateral support can be selectively coupled with and secured to the rack cross bar 22. The engaging recess 170 and protrusion 172 can define various connection mechanisms that can include, but are not limited to, a twist-lock connection, a friction connection, mechanical connections such as those that use pins, screws, bolts, and other fasteners that can be configured to selectively attach the rack lateral support to the rack cross bar 22.

Referring now to FIGS. 10-14, various accessory attachments can be disposed on the standard interface rack 10 that can be used in carrying the specific items or providing for a specific functionality of the standard interface rack 10.

Figure 9:
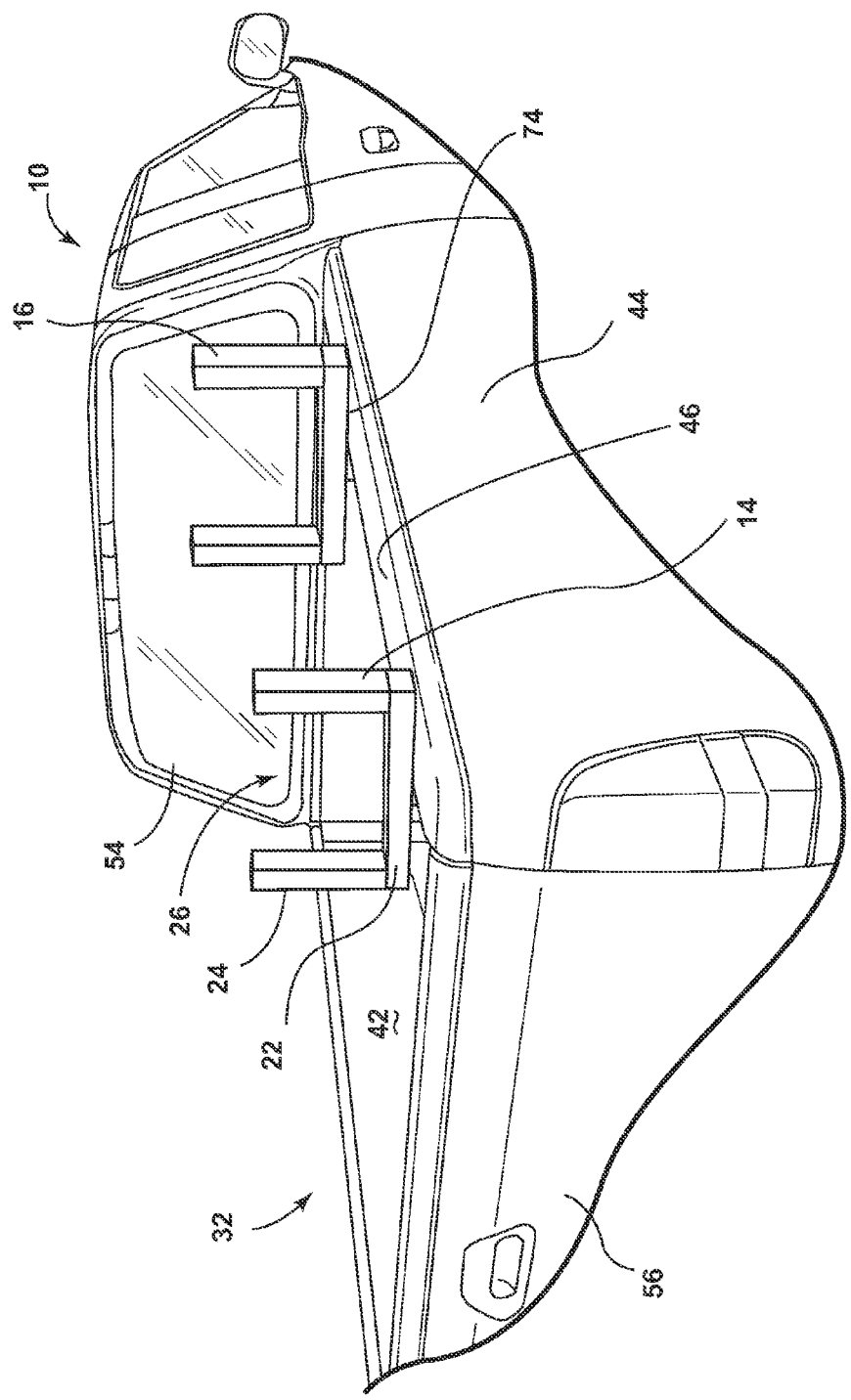
FIG. 9 is a rear perspective view of the standard interface rack of FIG. 1 installed in the vehicle.
Figure 10:
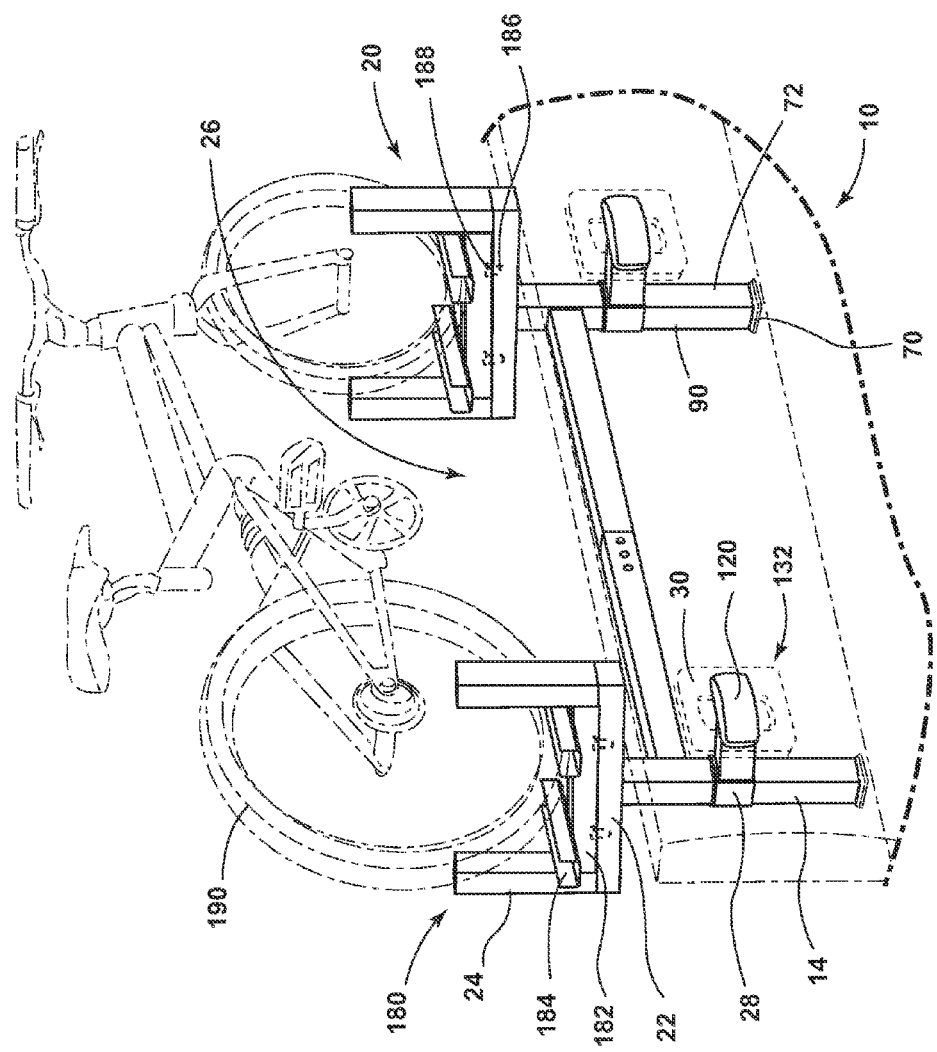
FIG. 10 is a top perspective view of another embodiment of the standard interface rack installed in the vehicle.

As shown in FIG. 10 of the illustrated embodiment, the standard interface rack 10 can include a bicycle rack 180 that can be disposed on the rack cross bars 22 between the rack lateral supports 24 and within the utility support region 26. The bicycle rack 180 can include horizontal base members 182 that can be connected to a top surface 46 of the rack cross bar 22 or fit over a portion of the rack cross bar 22. Channel members 184 can be coupled to the horizontal base member 182, where the channel members 184 are configured to receive the tires of a bicycle 190, shown in phantom, such that the bicycle 190 can be secured to the rack lateral supports 24 and the rack cross bars 22 of the standard interface rack 10. The bicycle rack 180 can include a single assembly having two horizontal base members 182 that fit over each of the rack cross bars 22. In alternate embodiments, the bicycle rack 180 can include two separate assemblies, each with a single horizontal base member 182 that fits over one of the rack cross bars 22, as shown in FIG. 9. The rack cross bar 22 and the rack lateral supports 24 can include connection receptacles 186 for receiving a bicycle rack fastener 188 that couples the bicycle rack 180 to the standard interface rack 10.

Figure 11:
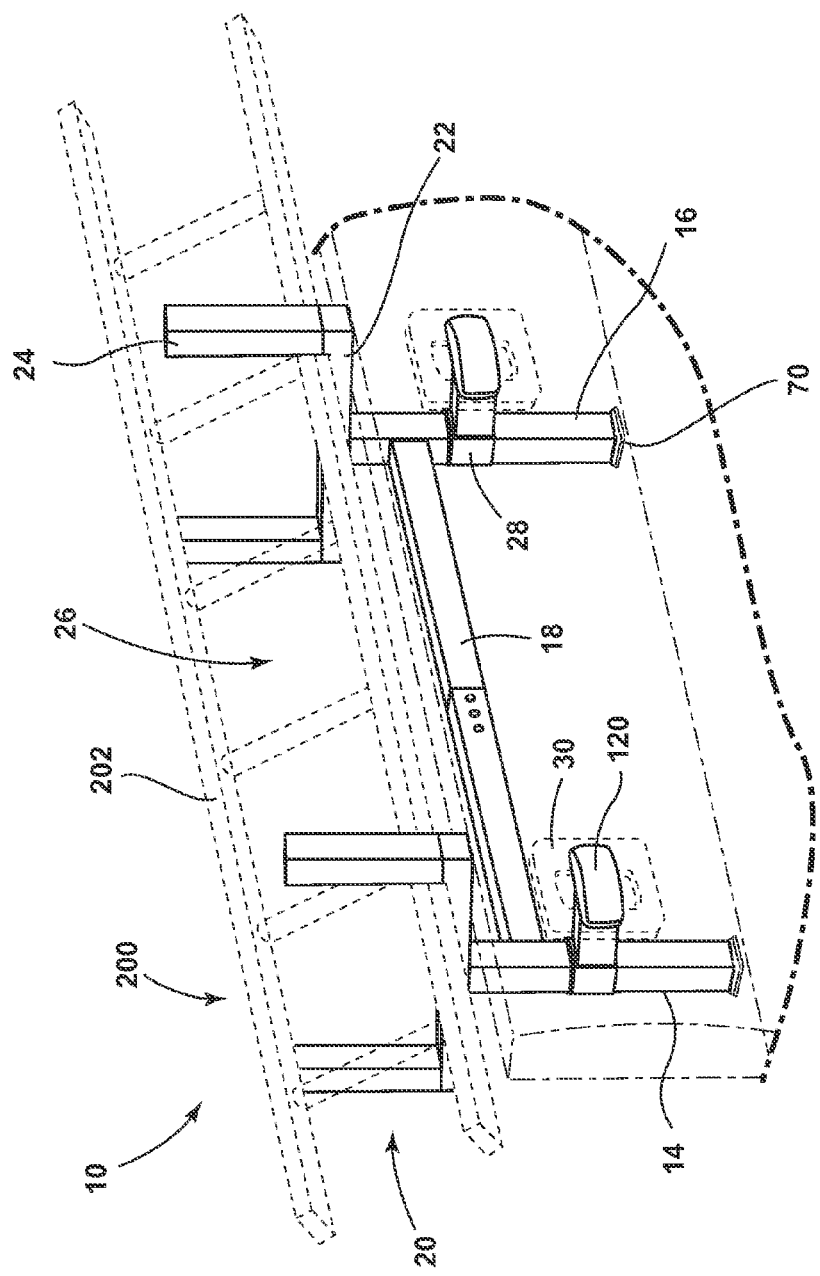
FIG. 11 is a top perspective view of another alternate embodiment of the standard interface rack installed in the vehicle.

Referring now to FIG. 11 of the illustrated embodiment, the standard interface rack 10 can include a ladder holding assembly 200 configured to secure a ladder 202, shown in phantom, to the standard interface rack 10 within the utility support region 26. During transportation of the ladder 202, the ladder 202 can be secured to the rack lateral support 24 and/or the rack cross bars 22 of the standard interface rack 10, such that the ladder 202 cannot unintentionally fall off of the standard interface rack 10 and outside the confines of the pick-up truck 32. In various embodiments, the standard interface rack 10 can include a center rack lateral support that can be configured to rest between the rungs of a ladder 202 disposed on the standard interface rack 10 to prevent unnecessary lateral movement of the ladder 202 during transport.

Figure 12:
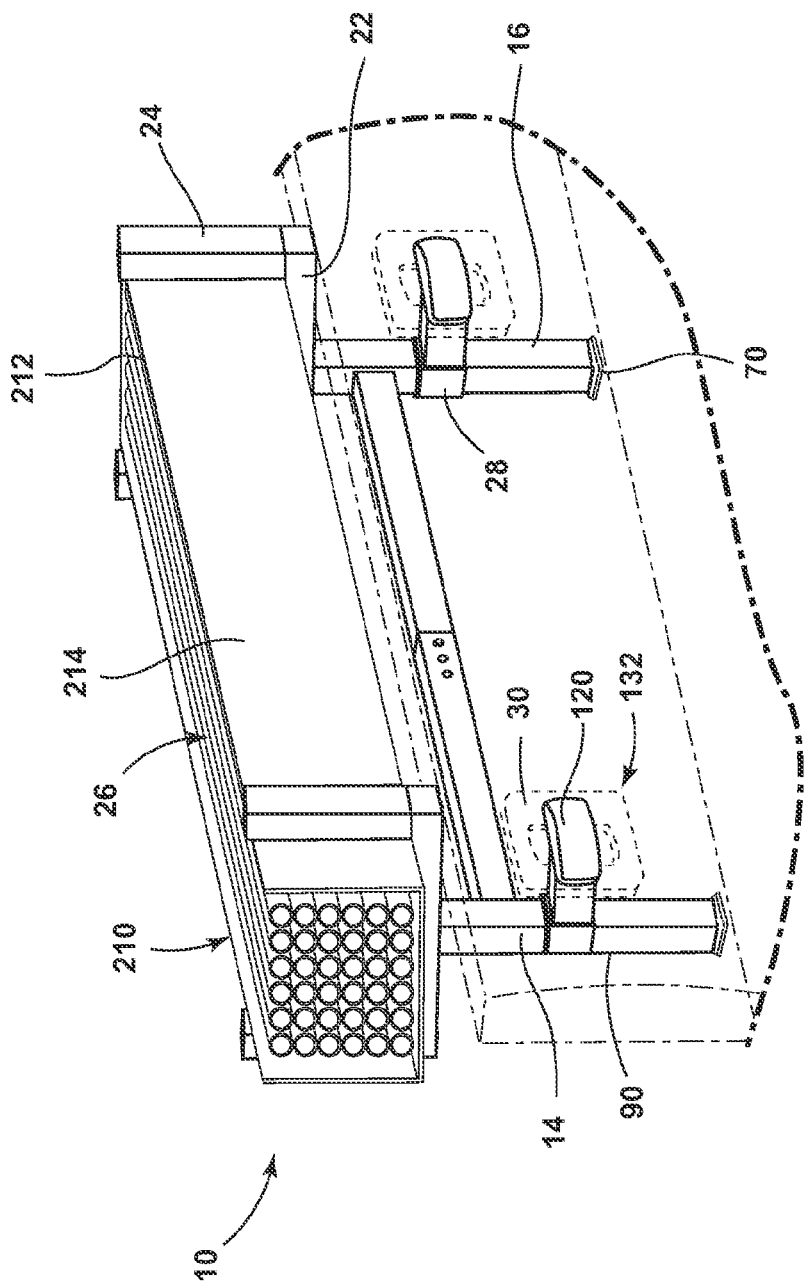
FIG. 12 is a top perspective view of another alternate embodiment of the standard interface rack installed in the vehicle.

Referring now to FIG. 12 of the illustrated embodiment, the standard interface rack 10 can also include a conduit/rebar/lumber rack 210 for assisting the user of a pick-up truck 32 in transporting substantially linear products and materials from one location to another. The conduit rack 210 is configured to engage both of the utility racks 20 of the first and second vertical support members 14, 16 to form a container 214 having at least three sides 212 and to which the conduit, rebar, lumber or other linear materials can be inserted and secured within the utility support region 26. Similar to the bike rack as described above, the conduit rack 210 can be secured to the first and second vertical support members 14, 16 through a variety of mechanical fasteners that can include, as discussed above, twist-lock fasteners, pins, screws, or other selectively removable fasteners that can couple the conduit rack 210 to the standard interface rack 10.

Figure 13:
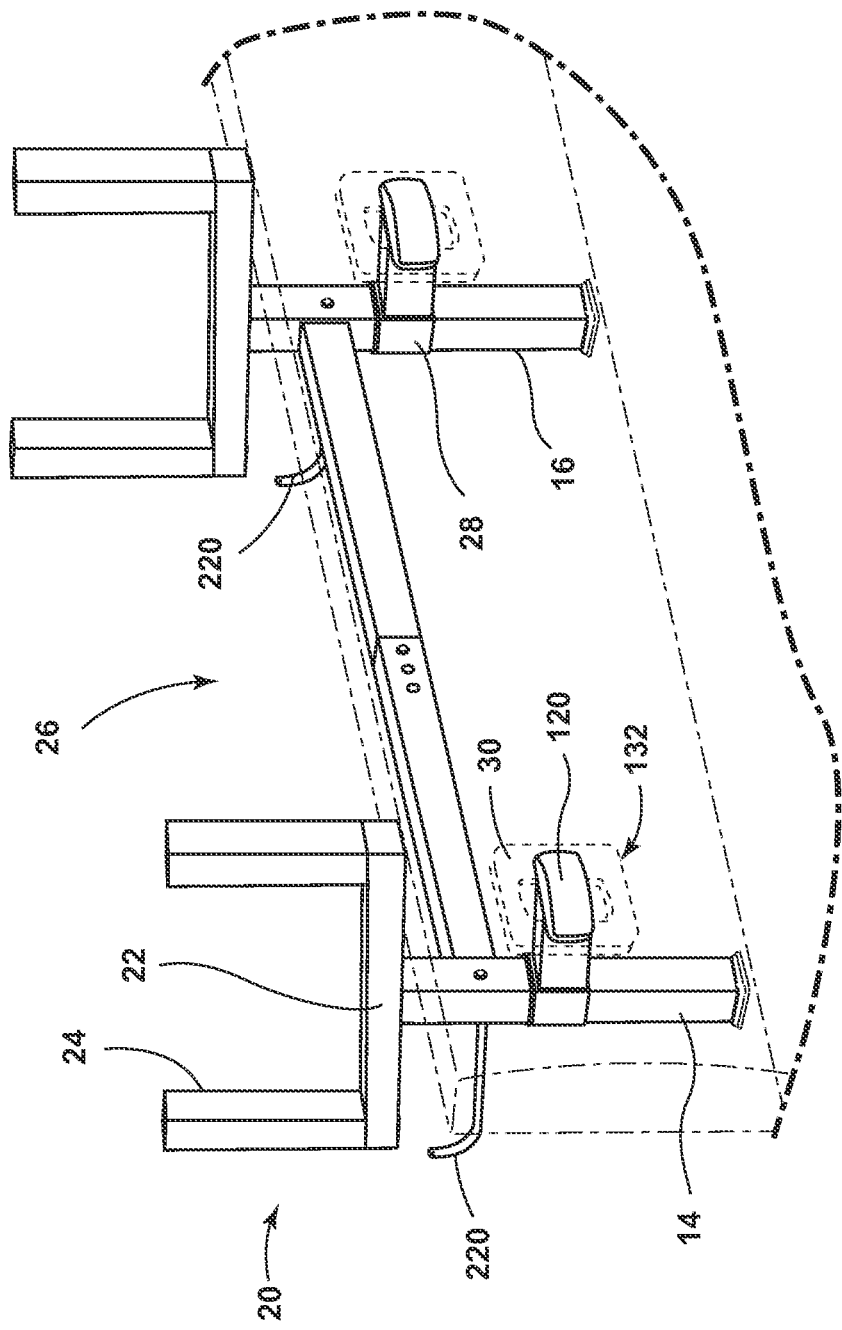
FIG. 13 is a top perspective view of another alternate embodiment of the standard interface rack installed in the vehicle.
Figure 14:
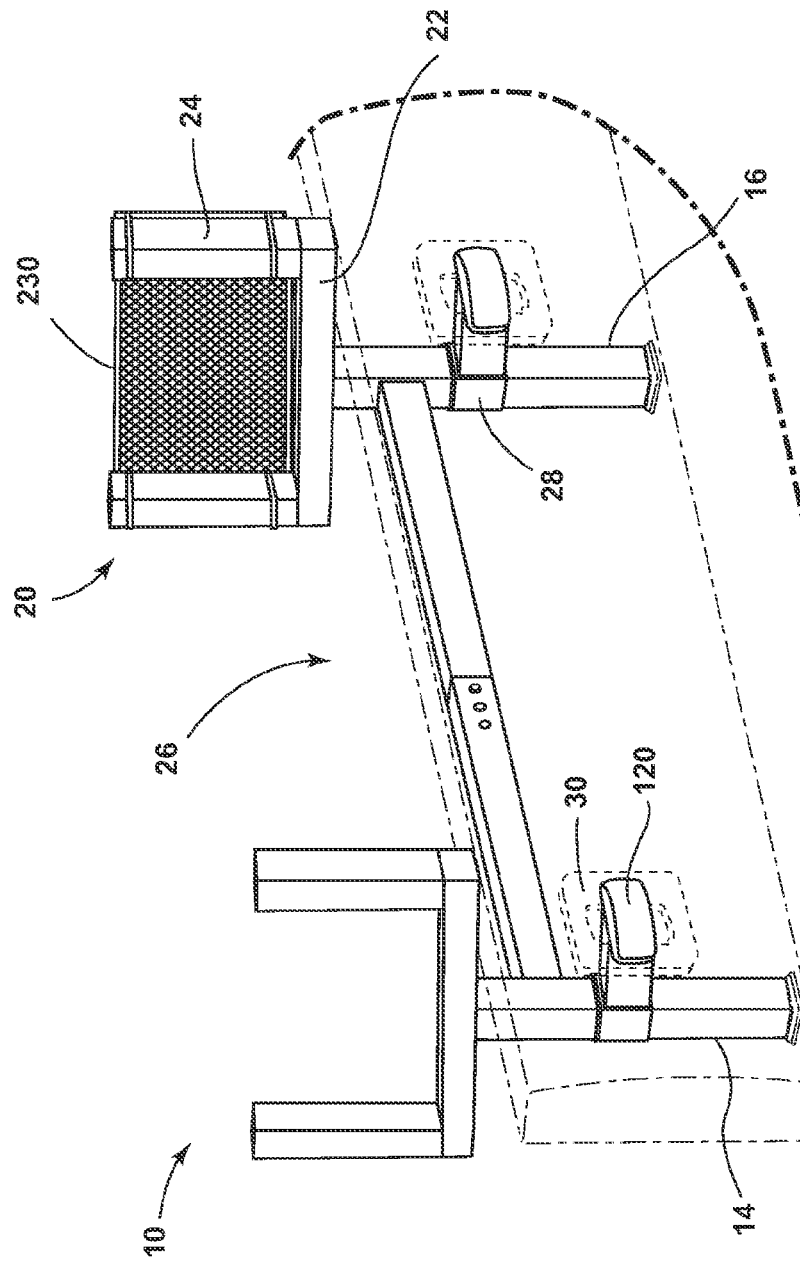
FIG. 14 is a top perspective view of another alternate embodiment of the standard interface rack installed in the vehicle.

Referring now to FIGS. 13 and 14, the standard interface rack 10 can also include at least one utility hook 220 that is coupled to a receptacle disposed in the standard interface rack 10. The utility hook 220 can be attached to the standard interface rack 10 by a variety of connections that can include, but are not limited to, screw connections, pin connections, twist-lock connections, or a variety of another connections that permit the utility hook 220 to be selectively secured to a portion of the standard interface rack 10. The standard interface rack 10 can also include a protective partition 230 that is coupled to the rack lateral supports 24 of at least one of the vertical support members 14, 16. The protective partition 230, commonly referred to as a "headache rack," is configured such that it is disposed behind either the driver or passenger seat and provides a protective barrier to prevent materials from rapidly moving forward in the event of a sudden stop of the pick-up truck 32 and thereby preventing potential injury to the driver or passenger.

In alternate configurations of the standard interface rack 10, the standard interface rack 10 can be disposed to a rear wall 240 of the cab 54 of the pick-up truck 32. In such an embodiment, the standard interface plates 30 of the standard interface rack 10 are disposed on the rear wall 240, with the twist-lock brackets 28 being attached thereto, and the rack structure 12 being installed in the twist-lock brackets 28, such that the standard interface rack 10 extends laterally from one sidewall 44 of the pick-up truck 32 to the other. In this embodiment, the protective partition 230 can be inserted on one of the rack lateral supports 24 of the first vertical support member 14 and one of the rack lateral supports 24 of the second vertical support member 16, thereby extending the protective partition 230 across the entire rear window 242 (shown in FIG. 1) of the pick-up truck 32 to provide protection to the entire cab 54 area from objects moving towards the cab 54 in the event of a sudden stop of the pick-up truck 32. In addition, in the described embodiment where the standard interface rack 10 extends laterally across the pick-up truck 32, the vertical support members 14, 16 can include an offset configuration such that each vertical support member 14, 16 engages the rack cross bar 22 in an offset configuration, such that when the standard interface rack 10 is installed proximate the rear wall 240 of the cab 54, the vertical support members 14, 16 can be installed proximate to the rear wall 240 of the cab 54.

The standard interface rack 10 provides a storage device for materials, athletic equipment, and various accessory items that is configured to have a low profile and a low center-of-gravity. In this manner, the lateral forces exerted on the vehicle while driving are minimized and the potential for damage to the vehicle as a result of such forces is not significantly increased. In addition, the low profile configuration makes it relatively easy to place items within and remove items from the standard interface rack 10. Moreover, the limited attachment also make installation relatively simple and secure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle interface rack comprising:
   at least one twist-lock bracket configured to be inserted into a vehicular twist-lock receptacle having a back wall and rotated within the vehicular twist-lock receptacle to define a locked position, wherein the twist-lock bracket engages the back wall; and
   a rack structure configured to rest upon a vehicle bed when the rack structure is in a secured position defined by a securing portion of the rack structure coupled with the at least one twist-lock bracket disposed in the locked position.

2. The vehicle interface rack of claim 1, wherein the vehicle bed is the bed of a pick-up truck, and wherein the vehicular twist-lock receptacle is disposed on a sidewall of a bedrail of the pick-up truck.

3. The vehicle interface rack of claim 1, wherein the vehicular twist-lock receptacle includes first and second interface plates and first and second twist-lock recesses defined at least by the first and second interface plates, respectively, and wherein the at least one twist-lock bracket includes a first twist-lock bracket configured to engage at least one of the first and second twist-lock recesses and a second twist-lock bracket configured to engage the other of the first and second twist-lock recesses.

4. The vehicle interface rack of claim 1, wherein the at least one twist-lock bracket includes a twist-lock fitting configured to be inserted into the vehicular twist-lock receptacle, a post receptacle configured to receive the securing portion of the rack structure when the at least one twist-lock bracket is disposed in the locked position, and a spacing bar that extends a predetermined distance between the twist-lock fitting and the post receptacle.

5. The vehicle interface rack of claim 2, wherein the rack structure includes first and second vertical support members and an adjustable cross member extending between the first and second vertical support members, wherein each of the first and second vertical support members includes a portion of the securing portion.

6. The vehicle interface rack of claim 5, wherein the adjustable cross member is operable between a first length and a second length.

7. The vehicle interface rack of claim 5, wherein each of the first and second vertical support members includes a utility rack, wherein each utility rack includes a horizontal member and at least one vertical member, wherein the at least one horizontal member includes a receptacle for selectively receiving the at least one vertical member, and wherein a portion of the horizontal member rests upon a top surface of the bedrail when the rack structure is in the secured position.

8. The vehicle interface rack of claim 5, wherein each of the first and second vertical supports includes a lower end having a selectively removable base, wherein the selectively removable base is made of a rubberized material, and wherein each selectively removable base rests upon the bed of the pick-up truck when the rack structure is in the secured position.

9. The vehicle interface rack of claim 1, comprising
   a plurality of detachable accessory members that are selectively received by the rack structure, wherein the detachable accessory members include at least one of:
   a bike rack;
   a ladder rack;
   a conduit rack
   a safety partition; and
   a utility hook.

10. A vehicle interface rack comprising:
    a twist-lock assembly having a locked position defined by at least one bracket rotationally secured to a sidewall receptacle of a pick-up truck bedrail, wherein at least a portion of the twist-lock assembly engages at least a back wall of the sidewall receptacle; and
    a rack structure having a secured position defined by a securing portion of the rack structure engaging the twist-lock assembly in the locked position and the rack structure vertically supported by a pick-up truck bed and a top surface of the bedrail.

11. The vehicle interface rack of claim 10, wherein the at least one bracket includes first and second twist-lock brackets, and wherein the sidewall receptacle includes first and second twist-lock recesses, and wherein the locked position defines the first twist-lock bracket being inserted into one of the first and second twist-lock recesses and rotated the predetermined distance and the second twist-lock bracket being inserted in the other of the first and second twist-lock recesses and rotated the predetermined distance.

12. The vehicle interface rack of claim 11, wherein each of the first and second twist-lock brackets include respective first and second securing receptacles configured to receive the securing portion of the rack structure when the first and second twist-lock brackets are in the locked position.

13. The interface rack of claim 12, comprising:
first and second twist-lock fittings disposed on the first and second twist-lock brackets, respectively, wherein each of the first and second twist-lock fittings includes a curved surface, wherein the back wall of the sidewall receptacle includes first and second back walls of the first and second twist-lock recesses, respectively, wherein the locked position is defined by the first back wall engaging the curved surface of at least one of the first and second twist-lock fittings and the second back wall engaging the curved surface of the other of the first and second twist-lock fittings.

14. The interface rack of claim 13, wherein the back walls of the respective first and second twist-lock receptacles is at least partially defined by a sidewall of the pick-up truck.

15. The interface rack of claim 10, wherein the rack structure includes first and second vertical support members and an adjustable cross member extending between the first and second vertical support members, wherein each of the first and second vertical support members include a portion of the securing portion.

16. The interface rack of claim 14, wherein the adjustable cross member is operable between a first length and a second length.

17. The interface rack of claim 15, wherein each of the first and second vertical support members includes a utility rack having a horizontal member and at least one vertical member, wherein the at least one horizontal member includes a receptacle for selectively receiving the at least one vertical member.

18. The interface rack of claim 15, wherein each of the first and second vertical supports includes a lower end having a base, wherein the base is made of a rubberized material.

19. The interface rack of claim 10, comprising:
a plurality of detachable accessory members that are selectively received by the rack structure, wherein the detachable accessory members include at least one of:
a bike rack;
a ladder rack;
a conduit rack;
a safety partition; and
a utility hook.

20. An interface rack comprising:
a rack structure;
first and second interface plates laterally supporting the rack structure in a secured position and disposed on a lateral surface of a side rail of a pick-up truck bed; and
first and second twist-lock brackets each having a locked position defined by the first and second twist-lock brackets rotatably coupled with the first and second interface plates, respectively, wherein the first and second twist-lock brackets selectively couple the rack structure to the first and second interface plates when the first and second twist-lock brackets are in the locked position, further defined by the first and second twist lock brackets being biased against the first and second standard interface plates, respectively, and the rack structure is in the secured position.

* * * * *